United States Patent
O'Brien et al.

(10) Patent No.: US 7,263,718 B2
(45) Date of Patent: *Aug. 28, 2007

(54) SECURITY FRAMEWORK FOR SUPPORTING KERNEL-BASED HYPERVISORS WITHIN A COMPUTING SYSTEM

(75) Inventors: Richard O'Brien, Brooklyn Park, MN (US); Raymond Lu, Shoreview, MN (US); Terrence Mitchem, Andover, MN (US); Spencer Minear, Fridley, MN (US)

(73) Assignee: Secure Computing Corporation, St. Paul, MN (US)

( * ) Notice: Subject to any disclaimer, the term of this patent is extended or adjusted under 35 U.S.C. 154(b) by 236 days.

This patent is subject to a terminal disclaimer.

(21) Appl. No.: 10/726,290

(22) Filed: Dec. 2, 2003

(65) Prior Publication Data

US 2004/0158720 A1    Aug. 12, 2004

Related U.S. Application Data

(63) Continuation of application No. 09/247,721, filed on Feb. 9, 1999, now Pat. No. 6,658,571.

(51) Int. Cl.
*G06F 7/04* (2006.01)
*G06F 9/00* (2006.01)
*G06F 11/00* (2006.01)

(52) U.S. Cl. .............. 726/6; 726/7; 726/14; 726/18; 726/19; 726/26; 726/29

(58) Field of Classification Search ............... 726/14, 726/18, 6, 7, 5, 4, 19, 17, 29, 28, 26
See application file for complete search history.

(56) References Cited

U.S. PATENT DOCUMENTS

| 5,029,206 | A | * | 7/1991 | Marino et al. ............... 713/164 |
| 5,457,798 | A |   | 10/1995 | Alfredsson ................. 395/700 |
| 5,504,814 | A |   | 4/1996 | Miyahara ....................... 380/4 |
| 5,692,204 | A | * | 11/1997 | Rawson et al. ............. 713/340 |
| 5,764,889 | A |   | 6/1998 | Ault et al. ................... 395/186 |
| 6,047,323 | A |   | 4/2000 | Krause ........................ 709/201 |
| 6,131,165 | A |   | 10/2000 | Lipkin et al. ............... 713/201 |
| 6,243,692 | B1 |   | 6/2001 | Floyd et al. ................... 705/59 |
| 6,247,127 | B1 |   | 6/2001 | Vandergeest ................ 713/100 |
| 6,289,457 | B1 | * | 9/2001 | Bishop et al. .................. 726/4 |
| 6,289,458 | B1 |   | 9/2001 | Garg et al. .................. 713/200 |
| 6,321,337 | B1 |   | 11/2001 | Reshef et al. ............... 713/201 |
| 6,453,419 | B1 | * | 9/2002 | Flint et al. ...................... 726/3 |
| 6,606,708 | B1 | * | 8/2003 | Devine et al. .................. 726/8 |

(Continued)

OTHER PUBLICATIONS

Goldberg, I., et al., "A Secure Environment for Untrusted Helper Applications", *Proceedings of the 6th USENIX Security Symposium*, (Jul. 1996).

(Continued)

*Primary Examiner*—Norman M. Wright
(74) *Attorney, Agent, or Firm*—Schwegman, Lundberg, Woessner & Kluth, P.A.

(57) ABSTRACT

An inventive security framework for supporting kernel-based hypervisors within a computer system. The security framework includes a security master, one or more security modules and a security manager, wherein the security master and security modules execute in kernel space.

27 Claims, 5 Drawing Sheets

U.S. PATENT DOCUMENTS 6,658,571 B1 * 12/2003 O'Brien et al. ............... 726/26
6,671,724 B1 * 12/2003 Pandya et al. ............. 709/226
6,701,362 B1 *  3/2004 Subramonian et al. ...... 709/224
2001/0037450 A1   11/2001 Metlitski et al. ............ 713/152
2002/0004762 A1 *  1/2002 Izumoto ..................... 705/26

OTHER PUBLICATIONS

Leech, M., et al., *RFC 1928: SOCKS Protocol Version 5*, (Mar. 1996).

* cited by examiner

SECURITY FRAMEWORK FOR SUPPORTING KERNEL-BASED HYPERVISORS WITHIN A COMPUTING SYSTEM

This application is a continuation of U.S. application Ser. No. 09/247,721 filed on Feb. 9, 1999 now U.S. Pat No. 6,658,571 which is incorporated herein by reference.

GOVERNMENT RIGHTS

This invention was made with Government support under Contract F30602-96-C-0338 awarded by the Air Force. The Government may have certain rights in this invention.

TECHNICAL FIELD

This invention relates generally to the field of secure computing environments, and more particularly to a security framework to dynamically wrap applications in a computing environment without requiring modification to an underlying operating system or the application itself, thereby limiting the amount of potential damage that a successful attacker or corrupt application can cause.

COPYRIGHTS

A portion of this patent document contains material that is subject to copyright protection. The copyright owners have no objection to the facsimile reproduction of the material by anyone, as it appears in the Patent and Trademark Office, patent files or records, but otherwise reserve all copyrights whatsoever.

BACKGROUND

There are many challenges to creating a highly secure computing environment such as preventing eavesdroppers from accessing private communications, preventing vandals from tampering with information while in transit from sender to receiver, verifying a network server is indeed the server it professes to be, safeguarding confidential documents from unauthorized individuals and correctly authenticating users who are attempting to access a network. One of the more difficult challenges is trying to limit the damage that an unauthorized individual can cause in the event that the individual is able to bypass the security mechanisms. Similarly, another difficult challenge is limiting the damage that malicious software can cause in the event that malicious software is accidentally executed by a computing system.

One conventional technique for limiting such damage has been to link special security libraries with each software application that will be executed by the computing system. The libraries prevent any corrupt software application from accessing system resources that would otherwise not normally be accessed via the software application. This approach has been discussed for TCP/IP applications where the SOCKS library is linked with each application. (Leech, M. et al., *RFC 1928: SOCKS Protocol Version 5*, March, 1996). This approach is impractical in that it requires customization of each software application and can be bypassed by making operating system calls that do not invoke the library.

Another approach has been to "wrap" an application with a protective layer of software. For example, wrappers have been developed that make use of an operating system's debug functionality. (Goldberg I. et al., "*A Secure Environment for Untrusted Helper Applications*," Proceedings of the 6th USENIX Security Symposium, July, 1996). This approach, however, requires running the operating system in debug mode which is impractical in that it significantly affects the performance of the system and introduces additional vulnerabilities.

For these reasons, and for other reasons stated below which will become apparent to those skilled in the art upon reading and understanding the present specification, there is a need in the art for a security mechanism that limits the amount of potential damage that a successful attacker or corrupt program can cause. Furthermore, there is a need for such a security mechanism that does not require using debug mode, additional hardware, or modification to the individual software applications or the underlying operating system.

SUMMARY

An inventive security framework for supporting kernel-based hypervisors within a computer system. The security framework includes a security master, one or more security modules and a security manager, wherein the security master and security modules execute in kernel space.

DETAILED DESCRIPTION

Figure 1:
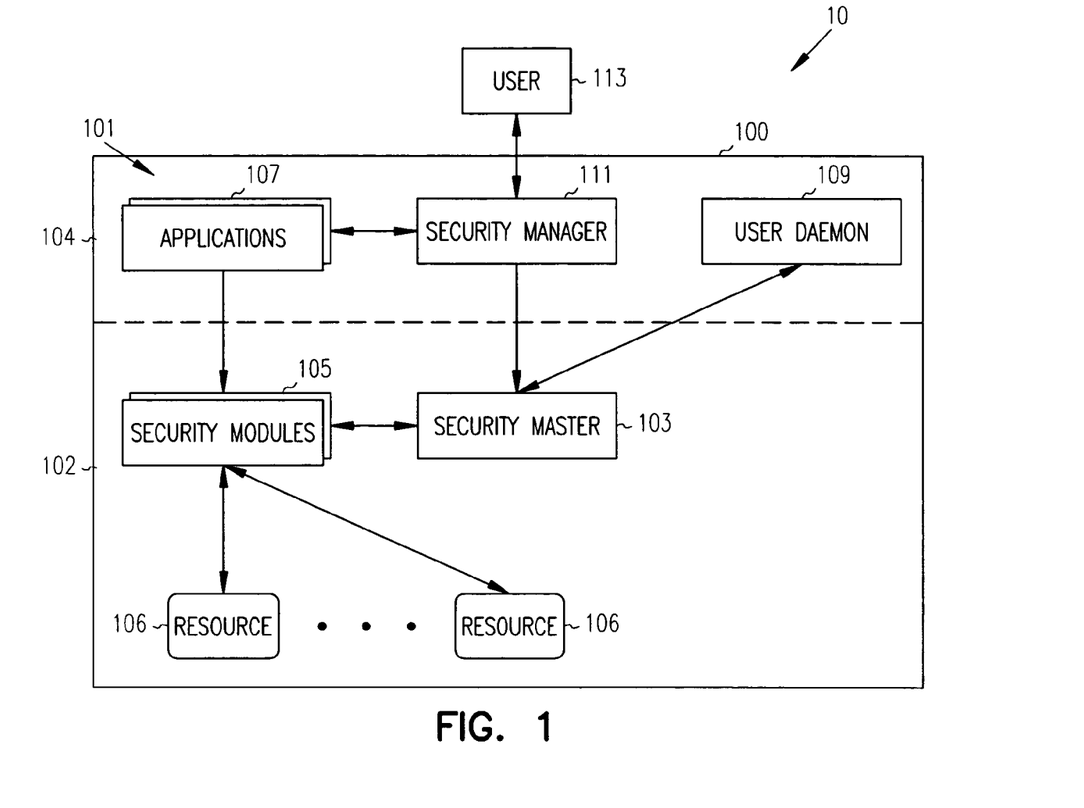
FIG. 1 is a block diagram of a computing system having a security framework that facilitates the use of kernel-based security modules for securely controlling access to computing resources on an application-specific basis.

A hypervisor is a layer of software disposed between hardware and an operating system that implements the same instruction set as the hardware. This concept has traditionally been used to implement virtual machines or to provide a fault-tolerant computing system. A kernel-based hypervisor is a layer of software within the kernel but between the operating system and the applications running in user space. FIG. 1 illustrates computing environment 10 in which security framework 101 facilitates the use of kernel-based hypervisors within computing system 100 in order to control access to computing resources 106 on an application-specific basis. In this manner, security framework 101 facilitates fine-grained access control of computing resources 106 such as memory, files, network sockets and processes. In addition, security framework 101 may be used to add security features, such as new security levels, roles, domains and types, to computing system 100 without requiring modifications to computing system 100.

Computing system 100 represents any processing system including, but not limited to, a personal computer, a workstation and a main frame computer. Computing system 100 includes an operating system and various internal computing components (not shown) including processing units, read only memory (ROM), random access memory (RAM), and one or more busses that operatively couple the components. There may be only one processing unit, such that computing system 100 comprises a single central-processing unit (CPU), or a plurality of processing units, commonly referred to as a parallel processing system. In one embodiment, computing system 100 is part of a computer network that couples a plurality of computing systems.

Security framework 101 can be used with any operating system that supports kernel-loadable modules including Linux™, Solaris™, and other modern Unix systems, as well as Windows™ NT. Thus, security framework 101 can be used to monitor commercial software without any modification to the software and can react in a manner that is transparent to the software. Security framework 101 has three main components: security master 103, security modules 105 and security manager 111. Security master 103 and security modules 105 execute in kernel 102 while security manager 111 executes in user space 104. Each component is discussed in turn below.

Security modules 105 are kernel-loadable modules that make and enforce application-specific or resource-specific policy decisions for applications 107. More specifically, security modules 105 grant or deny access to computing resources 106 based on either: (1) which application 107 is requesting access, or (2) which computing resource 106 is being requested. Thus, each security module 105 "wraps" one or more applications 107 in the sense that applications 107 cannot access computing resources 106 for which they are unauthorized in the event that an application 107 executes malicious software. Security modules 105 can be hierarchically configured ("stacked") such that modular security policies can be developed and implemented as needed. Furthermore, a single security module 105 can be designed to monitor a specific application 107 or a number of different applications 107. Security modules 105 can also be used to enforce other types of policies independent of any application 107.

Security modules 105 may be loaded within kernel 102 while computing system 100 is running. Therefore, even though security modules 105 run within kernel 102, they do not require modification to the source code of kernel 102. Because security modules 105 exist within kernel space 102, any malicious code within applications 107 cannot bypass security modules 105 as could be done if conventional security routines were linked within applications 107.

Security master 103 provides a kernel-based facility for installing, configuring, monitoring and removing security modules 105. Security master 103 further provides entry points for the following functions: registering a security module 105, intercepting system calls, releasing system calls, and communicating messages between security modules 105 and user space 104.

Security manager 111 provides an interface for communicating with security master 103, thereby allowing user 113 to configure and control security modules 105 from user space 104. Management functions available to user 113 include: the ability to list a set of rules that are being enforced by each security module 105, the ability to load a new set of rules for a particular security module 105, and the ability to log and view activity within security framework 101.

User daemon 109 executes in user space 104 and allows security master 103 to initiate actions in user space 104. More specifically, security master 103 communicates commands to user daemon 109 such that user daemon 109 performs various functions. As one example, security master 103 may command user daemon 109 to replicate files.

Security framework 101 can be used in a variety of ways to enhance the security and robustness of computing system 100. For example, security framework 101 may be configured to protect against malicious software by providing dynamic, fine-grained access control to computing resources 106. Unlike conventional access control lists that perform control based on the user, security framework 101 can enforce security policies for individual applications 107. For example, security framework 101 may be used to wrap a web browser in order to protect user 113 from downloaded malicious software. Furthermore, any application 107, or plug-in, which is started automatically from the web browser is subject to the policies enforced by the respective security module 105. This prevents malicious software from damaging computing resources 106 that user 113 is not normally allowed to access via the web browser.

Additionally, security framework 101 can provide audit and monitoring functionality to record information regarding the extent to which each application 107 accesses computing resources 106. Also, security framework 101 can be used to implement more sophisticated label-based policies, such as a multilevel secure (MLS) policy or a type enforcement policy. In one embodiment, security framework 101 creates and maintains a list of labels, each label corresponding to a computing resource 106. Because of the flexibility of security framework 101, these label-based policies could be quickly changed, if needed, to adapt to new operating requirements. Security framework 101 can also provide replication features by duplicating system calls that modify system resources, such as files. In one embodiment, user daemon 109 is able to store and replay file access requests that are intercepted by security framework 101, thereby effectively duplicating operations on a monitored portion of the file system.

As another example, security framework 101 may be used to ensure that the damage is limited in the event that a remote user compromises a web server. Security framework 101 can ensure that files being served by the web server are not modified inappropriately. For example, malicious users sometimes attack CGI scripts on a web server because CGI scripts are often easily compromised. In particular, an attacker may compromise a CGI script and thereby launch an attack on the web server and the rest of the network. By limiting the ports to which a CGI script can attach, security framework 101 can limit attacks to only those computing resources 106 that are coupled to those ports.

Figure 2:
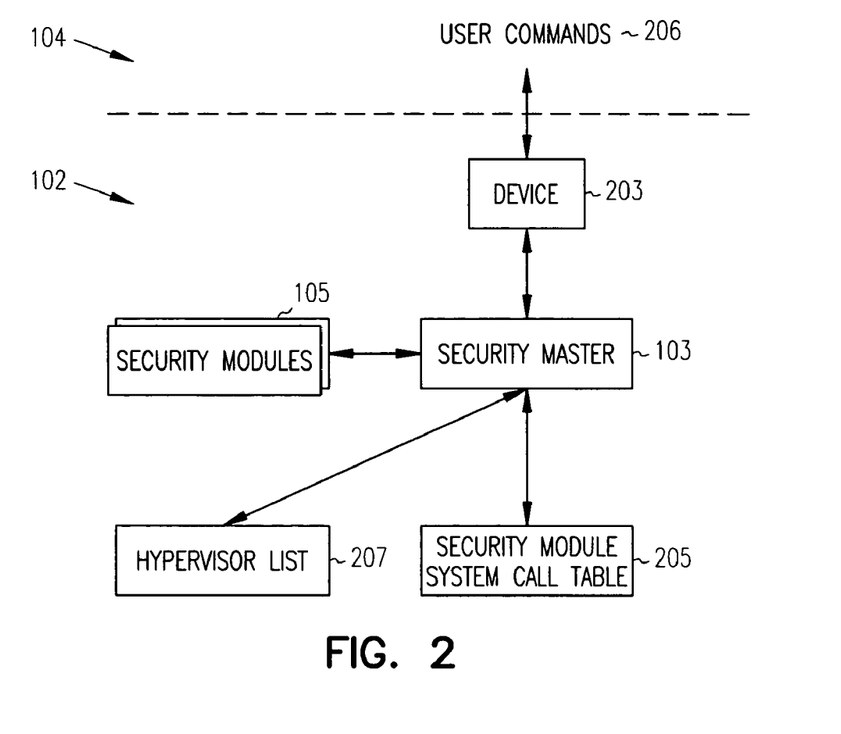
FIG. 2 is a block diagram illustrating one particular embodiment of the security framework.

FIG. 2 illustrates one particular embodiment of security framework 101. Security master 103 provides an application programming interface (API) that allows security modules 105 to register themselves and the system calls that they monitor. Security master 103 requires that a security module 105 register itself before the security module 105 can process a system call 301. In one embodiment security master 103 assigns a unique "id" to each security module 105 in order to deliver messages from user space 104 to the correct security module 105. Security master 103 maintains security module list 207 in order to keep track of all currently registered security modules 105 and of the particular system calls that each security module 105 is monitoring. When a security module 105 unregisters itself via the API, security master 103 removes it from list 207.

When registering with security master 103, each security module 105 provides a message handler to be called when a program sends user commands 206 to the security module 105. The security module 105 may also supply a reply queue if it wishes to respond to any messages it receives. Device 203 facilitates communication between user space 104 and security master 103. Device 203 allows user 113 to enter commands 206 in order to retrieve statistical information or dynamically configure a security module 105, including updating the security policy that the security framework 101 enforces. Device 203 also provides a mechanism by which security modules 105 communicate with user daemon 109.

Conventional operating systems include a system call table (ST) that contains pointers to handlers for the various system calls. In order to invoke a security module 105 when a system call is intercepted, security master 103 modifies the system call table (ST) of the operating system of computing system 100. For each system call being wrapped, security master 103 redirects each pointer from the standard handler within the operating system to a corresponding system call wrapper within security master 103. In one embodiment, security framework 101 includes security module system call table (SM-SCT) 205 having a plurality of entries, each entry includes the following fields: a pointer to the original system call handler within the operating system, pointers to pre-processing and post-processing software for each security module 105 that is monitoring the system call, and a pointer to the corresponding wrapper within security master 103. The wrapper invokes the pre-processing software, executes the system call handler within the operating system and invokes the post-processing software.

When a system call is released by a specific security module, security master 103 verifies that the requesting security module 105 is registered and verifies that the requesting security module 105 has registered the system call as one it is monitoring. In addition, security master removes the specific security module handlers from the handler list for system call in SM-SCT 205, and if there are no more handlers for the system call, sets the entry for the system call in the ST to its original value.

Figure 3:
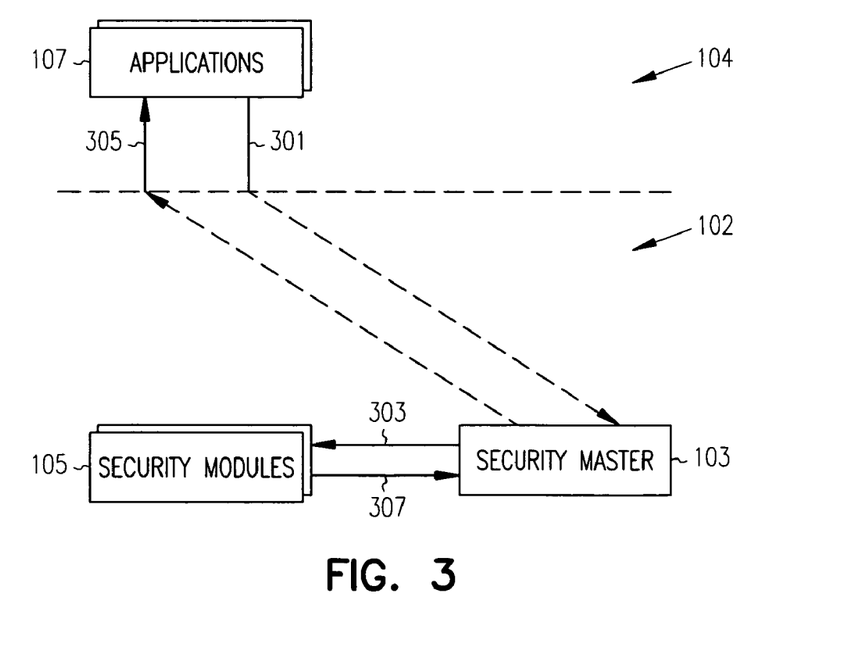
FIG. 3 illustrates the novel security framework intercepting and processing system calls from one or more applications executing on the computing system.

FIG. 3 illustrates how security framework 101 monitors and evaluates system calls 301 from applications 107. After receiving each system call 301, the operating system of computing system 100 invokes the wrapper within security master 103 according to the security module system call table (SM-SCT) 205, which in turn issues a call 303 to each security module 105 that is monitoring system call 301 to initiate pre-call processing. Pre-call and post-call processing are used to enforce the respective security module's 105 particular security policy or to initiate other actions by security module 105. For example, this processing could include additional auditing of system calls 301 such as auditing parameters and results; performing access checks and making access decisions for computing resources 106; modifying parameters of system call 301; and passing information to user daemon 109.

If the pre-call processing fails, security module 105 sends result 307 indicating an error to the wrapper within security master 10. The wrapper sends a reply 305 indicating the error to the respective application 107. If results 307 from all security modules 105 that are monitoring the system call indicate that pre-call processing 303 is successful, security master 103 invokes the original handler for the system call. Next, security master 103 issues a call 303 to each security module 105 to perform post-call processing. The results 307 of the post-processing are returned to the wrapper within the security master 103. The wrapper returns the results to the application 107 via reply 305.

Figure 4:
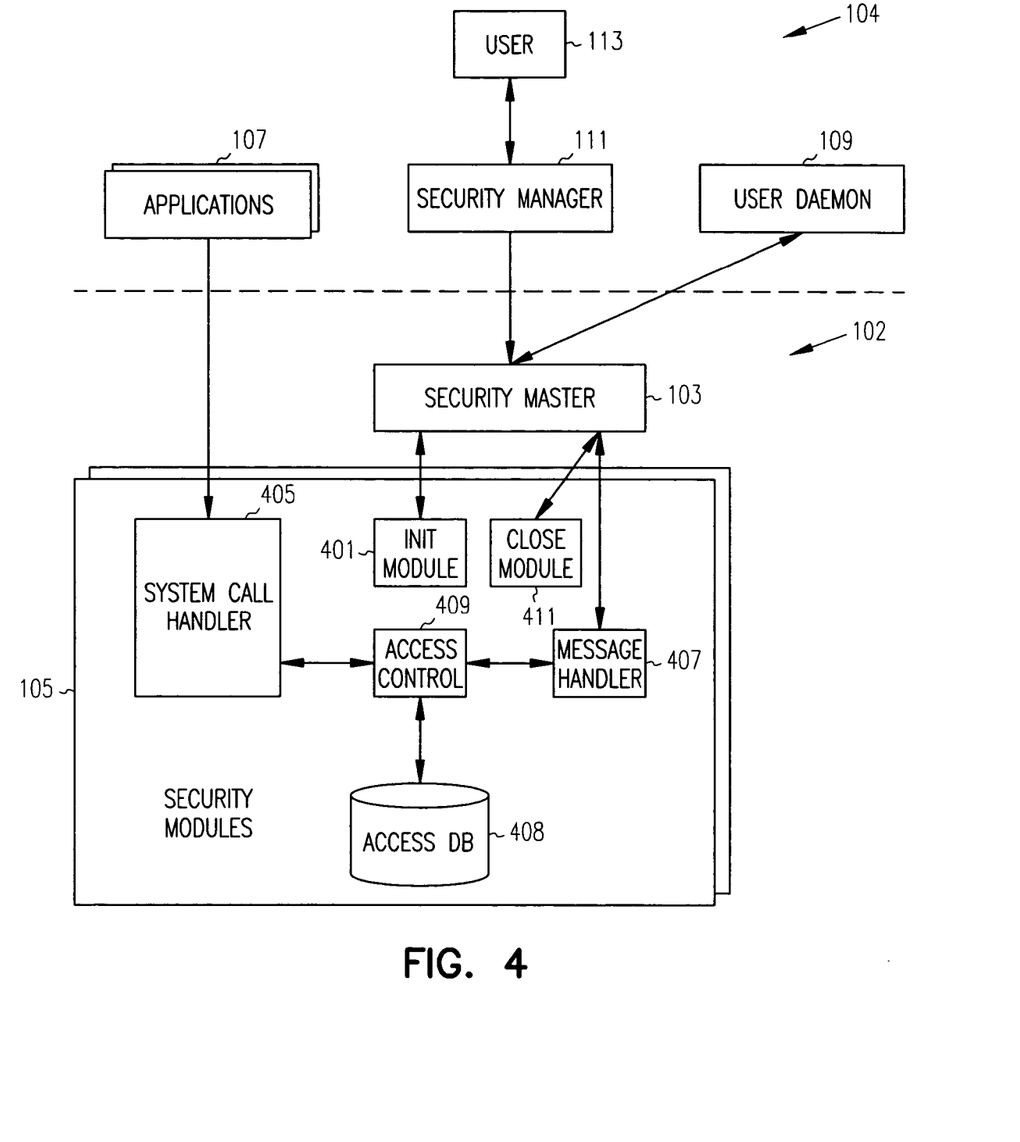
FIG. 4 illustrates one embodiment of a security module for wrapping an application executing on the computing system.

FIG. 4 illustrates one embodiment of a security module 105 that is divided into five functional components: initialization module 401, system call handler 405, message handler 407, access control database 408, access control module 409, and close module 411. Initialization module 401 is responsible for registering security module 105 with security master 103 and communicating the following information to the security master 103: name, description, a pointer to message handler 407, and a message reply queue. After a successful registration, initialization module 401 registers all pre and post-processing functions to be executed with each system call 301 that security module 105 monitors. When security module 105 is unloaded from the kernel 102, close module 411 releases all the kernel buffers that were acquired and unregisters security module 105 from security master 103. Access control database 408 stores an access control list for security module 105 and any other application-specific security information.

Figure 5:
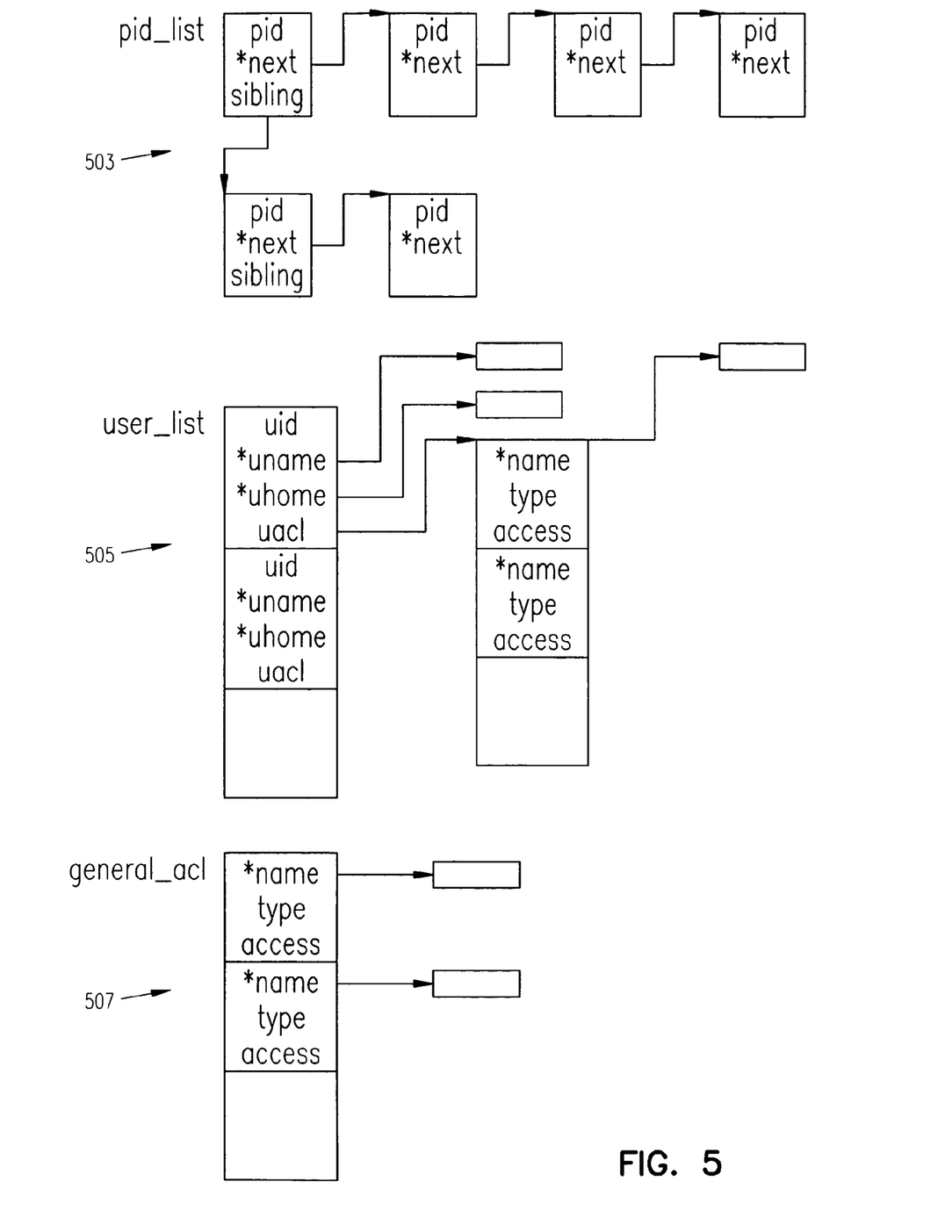
FIG. 5 illustrates one embodiment of data structures for maintaining application-specific security information.

FIG. 5 illustrates one embodiment of data structures used by security modules 105 for maintaining information about applications 107. Pid list 503 contains all the process IDs that are forked or spawned by a monitored application 107 or their children. All child processes of a monitored application 107 are linked using the next field of the structure. User list 505 contains the names, user IDs, and user directories for user 113 as well as user-specific access control rules. General access control list 507 contains general access control rules for user 113.

Figure 6:
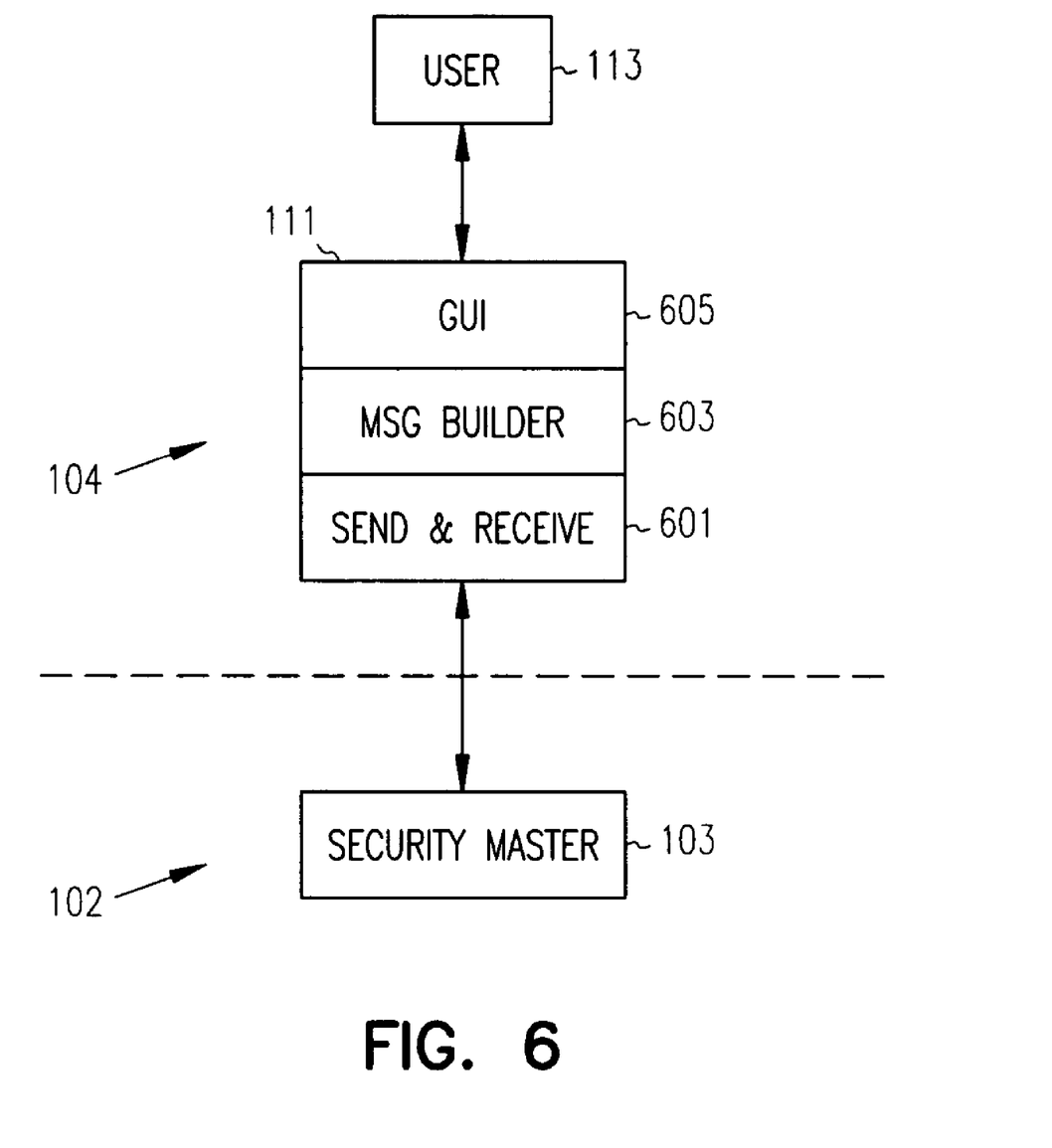
FIG. 6 illustrates one embodiment of a security manager for configuring and controlling the kernel-based security modules.

FIG. 6 illustrates one embodiment of security manager 111 including three major components: graphical user interface ("GUI") 605, message builder 603 and send & receive message module 601. GUI 605 provides a simple way for user 113, such as a system administrator, to command security manager 111 to perform various functions such as printing rules enforced by a given security module 105, configuring a security module 105, and setting logging levels for security framework 101. Message builder 603 builds messages for communicating with security master 103 or security modules 105. Communication between security modules 105 and security manager 111 is performed through device 203 (FIG. 2). In one embodiment security manager 111 sends and receives messages by opening device 203 and communicating a message buffer with a device descriptor and a buffer pointer.

EXAMPLES

To further illustrate security framework 101, three embodiments will be subsequently described: one for wrapping a web browser, one for replicating files, and one for wrapping a web server.

A Web Browser Security Module

The web browser security module prevents a user who is browsing the Internet from damaging computing system 100 after downloading and executing malicious active content. The browser security module accomplishes this by monitoring system calls made by any conventional browser, such as Netscape'S™ Navigator™, and by enforcing a policy that only allows certain computing resources 106 to be accessed. Typical system calls monitored by the web browser security module include fork, execve, open, mkdir, rmdir, create and socket. In particular, the set of files that the browser can access is controlled such that the browser effectively operates within its own limited execution content. While this does not prevent malicious code from accessing and possibly damaging resources within this execution context, it does limit the damage that could be done to only these resources. The execution context typically includes a designated directory for user 113 as well as limited access to other libraries that are needed by the browser to execute. Most files in the computing system 100, or computer network system 160, therefore, are not within this execution context and cannot be damaged. Security framework 101 keeps track of all applications 107 started from within the browser, such as a postscript viewer, and enforces the same policy on them as on the browser.

In one embodiment, the security policy that the browser security module enforces is stated as a set of rules identifying which computing resources 106 the browser is allowed to access as well as what permissions the browser has. If there is no rule that allows access to a computing resource 106, then security framework 101 refuses any requests to access that computing resource 106. In one embodiment, the format of the rules is:

<type> <identifier> <permissions> where <type> is either a file, socket, or process, <identifier> is either a pathname, an IP address, or a process ID, and <permissions> specifies permitted operations and depends on the type. Rules can be overridden by stating another, more specific, rule. For example, if a rule allows read access to all files and subdirectories of a directory then user 113 can be prevented from accessing a specific file by an additional rule for this file with permissions set to none. One advantage of security framework 101 is that there is no performance penalty when running the browser security module except when the browser is started; however, even this performance penalty is substantially minimal.

A Replication Security Module

A replication security module can be used to transparently replicate a file or set of files. The replication facility therefore allows immediate backup of changes to a file without having to modify any applications that are making the actual changes. More specifically, the replication security module monitors all system calls 301 that modify any file within a set of files to be replicated. Typical system calls monitored by the replication security module include write, read, open, mkdir, rmdir, create and close. When loaded into kernel 102, the replication security module registers its pre-process and post-process routines with the security master 103 to wrap certain file-related system calls. Once the pathnames are configured, the replication security module starts checking the files accessed by the system calls 301. When such a system call 301 is identified by the replication security module, the replication security module caches the system call parameters and allows the system call processing to continue. If system call processing completes successfully, then the security master 103 sends the cached input parameters to user daemon 109, operating in user space 104, that replays the system call 301 with the cached parameters on a copy of the file set. With this method, files can be replicated on the computing system 100 or across a computer network.

In this embodiment user daemon 109 includes two components: configuration file processing and replication message processing. The configuration file processing for replication provides the information about pathnames for files that need to be replicated and the replication destination. The configuration file is first parsed when user daemon 109 is started. If the parsing is successful, user daemon 109 replicates the original source files under the replication destination. Then user daemon 109 sends source pathnames to the replication security module. When user daemon 109 is ready for receiving replication messages, it sends a start-replication request to the replication security module and goes to sleep until awakened.

A Web Server Security Module

A web server, such as an Apache™ web server, requires at least two types of protection. First, the web server must be restricted to a subset of computing resources 106 so that any attack coming through the web server will be contained. This is accomplished with a web server security module that provides similar protection for the web server application 107 as the browser security module provides for a browser application 107. Second, configuration and content files used by the web server must be isolated from modification by unauthorized individuals. This prevents an attacker from changing the content displayed by a particular web server and is accomplished by a second security module that provides a circle of protection (COP) around the web server. Once installed and configured, the second security module restricts access to the files within the COP from any user 113 that does not have privileges. In one embodiment, the second security module maintains a list of files to be protected. The filename of any file being opened is checked against the list. Typical system calls monitored by the second security module include setuid, chdir, open, mkdir, rmdir, create, chmod, chown, rename and close.

Because the second security module does not protect files against access by a particular process, but rather controls access to protected files regardless of what application 107 is requesting the access, the second security module does not correspond to a particular application 107. Because file accessibility may vary among users, no general access control list is used. Rather, the access control list must specify both user and corresponding file accessibility. In fact, each listed file must belong to one and only one user's circle of protection.

CONCLUSION

Various embodiments of a security framework have been presented for selectively wrapping standard, commercially-available software applications, such as Netscape Navigator, in order to protect computing resources and to implement application-specific or resource-specific policies. The security framework includes a security master that coordinates installation and removal of kernel-based security modules and provides a means for managing the kernel-based security modules. The security modules are loadable kernel modules that perform pre-call and post-call processing. The security modules are easy to install, requiring no modification to the existing operating system or to the software applications that they are monitoring. The security modules may be hierarchically configured such that a variety of application-specific policies can easily be implemented, each by means of its own kernel-based security module.

Because the security modules reside in the kernel, the security framework cannot be bypassed. Furthermore, because they do not require modification to the wrapped application, the security framework can be used to dynamically wrap applications that are started by other applications that have already been wrapped. Because the security modules can be easily configured, the policy that the framework enforces can be dynamically modified as needed. The security framework has a number of potential applications, including protecting a computing system from malicious software downloaded via a web browser, wrapping web servers and firewalls in order to limit possible compromises, and replicating file operations. This application is intended to cover any adaptation or variation of the present invention; therefore, it is intended that this invention be limited only by the claims and equivalents thereof.

What is claimed is:

1. A security framework for supporting kernel-based hypervisors within a computer system, the security framework comprising:
    a security master;
    one or more security modules; and
    a security manager;
    wherein the security master and security modules execute in kernel space.

2. The security framework of claim 1, wherein the security manager executes in user space.

3. The security framework of claim 1, wherein one of the security modules is designed to apply a security policy to a specific application.

4. The security framework of claim 1, wherein one of the security modules is designed to apply a security policy to two or more different applications.

5. The security framework of claim 1, wherein one of the security modules enforces application-specific policy decisions for applications running in user space.

6. The security framework of claim 5, wherein the security module grants access to one or more computing resources as a function of the application requesting access.

7. The security framework of claim 5, wherein one of the security modules enforces resource-specific policy decisions for applications running in user space.

8. The security framework of claim 7, wherein the security module grants access to one or more computing resources as a function of the computing resource being requested.

9. The security framework of claim 7, wherein one of the security modules is designed to apply a security policy to a specific application.

10. The security framework of claim 7, wherein one of the security modules is designed to apply a security policy to two or more different applications.

11. The security framework of claim 7, wherein the security master includes a kernel-based facility for installing, configuring, monitoring and removing security modules.

12. The security framework of claim 7, wherein the security master includes:
    a kernel-based facility for installing, configuring, monitoring and removing security modules; and
    entry points for registering a security module, intercepting system calls, releasing system calls, and communicating messages between security modules and user space.

13. The security framework of claim 7, wherein the security manager includes an interface for communicating with security master, wherein the interface permits a user to configure and control security modules from user space.

14. The security framework of claim 7, wherein the security manager includes an interface for communicating with security master, wherein the interface permits a user to configure and control security modules from user space, wherein management functions available to the user include:
    the ability to list a set of rules that are being enforced by each security module;
    the ability to load a new set of rules for a particular security module; and
    the ability to log and view activity within the security framework.

15. The security framework of claim 7, wherein a user daemon executes in user space and allows the security master to initiate actions in user space.

16. The security framework of claim 1, wherein one of the security modules enforces resource-specific policy decisions for applications running in user space.

17. The security framework of claim 16, wherein the security module grants access to one or more computing resources as a function of the computing resource being requested.

18. The security framework of claim 16, wherein one of the security modules is designed to apply a security policy to a specific application.

19. The security framework of claim 16, wherein one of the security modules is designed to apply a security policy to two or more different applications.

20. The security framework of claim 16, wherein the security modules are hierarchically configured.

21. The security framework of claim 1, wherein the security modules are hierarchically configured.

22. The security framework of claim 1, wherein the security modules are designed so they can be loaded while the computing system is running.

23. The security framework of claim 1, wherein the security master includes a kernel-based facility for installing, configuring, monitoring and removing security modules.

24. The security framework of claim 1, wherein the security master includes:
    a kernel-based facility for installing, configuring, monitoring and removing security modules; and
    entry points for registering a security module, intercepting system calls, releasing system calls, and communicating messages between security modules and user space.

25. The security framework of claim 1, wherein the security manager includes an interface for communicating with security master, wherein the interface permits a user to configure and control security modules from user space.

26. The security framework of claim 1, wherein the security manager includes an interface for communicating with security master, wherein the interface permits a user to configure and control security modules from user space, wherein management functions available to the user include:
    the ability to list a set of rules that are being enforced by each security module;
    the ability to load a new set of rules for a particular security module; and
    the ability to log and view activity within the security framework.

27. The security framework of claim 1, wherein a user daemon executes in user space and allows the security master to initiate actions in user space.

* * * * *